United States Patent
Bajaj et al.

(10) Patent No.: US 10,733,247 B2
(45) Date of Patent: Aug. 4, 2020

(54) METHODS AND SYSTEMS FOR TAG EXPANSION BY HANDLING WEBSITE OBJECT VARIATIONS AND AUTOMATIC TAG SUGGESTIONS IN DYNAMIC TAG MANAGEMENT

(71) Applicant: Adobe Inc., San Jose, CA (US)

(72) Inventors: Payal Bajaj, Bangalore KA (IN); Niyati Chhaya, Pune (IN); Harsh Jhamtani, Uttar-Pradesh (IN); Shriram Venkatesh Shet Revankar, Bangalore KA (IN); Anandhavelu N, Kangayam TN (IN)

(73) Assignee: Adobe Inc., San Jose, CA (US)

( * ) Notice: Subject to any disclaimer, the term of this patent is extended or adjusted under 35 U.S.C. 154(b) by 1102 days.

(21) Appl. No.: 15/046,995

(22) Filed: Feb. 18, 2016

(65) Prior Publication Data
US 2017/0243234 A1 Aug. 24, 2017

(51) Int. Cl.
*G06F 16/9535* (2019.01)
*G06Q 30/02* (2012.01)

(52) U.S. Cl.
CPC ..... *G06F 16/9535* (2019.01); *G06Q 30/0201* (2013.01)

(58) Field of Classification Search
CPC ......... G06Q 30/02; G06F 16/583; G06F 9/45; G06F 16/9535
See application file for complete search history.

(56) References Cited

U.S. PATENT DOCUMENTS

| 7,689,585 | B2 * | 3/2010 | Zeng | G06F 16/951 |
| | | | | 707/999.104 |
| 9,043,320 | B2 * | 5/2015 | Monga | G06F 16/38 |
| | | | | 707/728 |
| 9,189,552 | B2 * | 11/2015 | Riley | G06F 16/9535 |
| | | | | 707/709 |
| 2005/0234972 | A1 * | 10/2005 | Zeng | G06F 16/951 |
| 2009/0319481 | A1 * | 12/2009 | Chitrapura | G06F 16/951 |

(Continued)

OTHER PUBLICATIONS

Tag Manager—Analytics Tag Management / Google Tag Manager (GTM), downloaded from www.google.com/analytics/tag-manager/#section-one Feb. 5, 2016, 11 pages.

(Continued)

*Primary Examiner* — Shahid A Alam
(74) *Attorney, Agent, or Firm* — Kilpatrick Townsend & Stockton LLP

(57) ABSTRACT

Disclosed are various embodiments for automatically creating on a computer analytics tags for different object types of website objects in web pages with analytics tracking capability in a dynamic tag management system. In one implementation, user input is received identifying a website object for tagging in the web pages and keywords are identified based on the user input. Based on the keywords, multiple occurrences of the website object in the web are identified, wherein the multiple occurrences of the website object correspond to multiple object types. The computer automatically creates analytics tags for the website object corresponding to object types. Based on the website object, an expansion object is identified and the computer automatically creates an analytics tag for the expansion object.

17 Claims, 7 Drawing Sheets

(56) References Cited

U.S. PATENT DOCUMENTS

| | | | | |
|---|---|---|---|---|
| 2010/0318976 | A1* | 12/2010 | Everly | G06F 9/45 |
| 2011/0208707 | A1* | 8/2011 | Monga | G06F 16/38 |
| | | | | 707/706 |
| 2011/0225134 | A1* | 9/2011 | Monga | G06F 16/9038 |
| | | | | 707/706 |
| 2013/0013428 | A1* | 1/2013 | Lyon | G06Q 30/02 |
| 2013/0046771 | A1* | 2/2013 | Moitra | G06F 16/951 |
| | | | | 707/749 |
| 2013/0332817 | A1* | 12/2013 | Seifert | G06F 16/972 |
| | | | | 715/234 |
| 2014/0129540 | A1* | 5/2014 | Riley | G06F 16/9535 |
| | | | | 707/709 |
| 2014/0222553 | A1* | 8/2014 | Bowman | G06Q 30/0276 |
| | | | | 705/14.45 |
| 2014/0298162 | A1* | 10/2014 | Cohen | G06F 16/95 |
| | | | | 715/234 |
| 2015/0220802 | A1* | 8/2015 | Mazur | G06F 16/583 |
| 2015/0379148 | A1* | 12/2015 | Riley | G06F 16/00 |
| | | | | 707/707 |

OTHER PUBLICATIONS

Adobe Marketing Cloud dynamic tag management overview, downloaded from www.adobe.com/solutions/digital-marketing/dynamic-tag-management.html Feb. 5, 2016, 2 pages.

* cited by examiner

METHODS AND SYSTEMS FOR TAG EXPANSION BY HANDLING WEBSITE OBJECT VARIATIONS AND AUTOMATIC TAG SUGGESTIONS IN DYNAMIC TAG MANAGEMENT

TECHNICAL FIELD

This disclosure relates generally to computer-implemented methods and systems and more particularly to automatically creating analytics tags for different object types of website objects in dynamic tag management.

BACKGROUND

Many websites track users' activities in order to measure website performance and improve users' experience. One method of tracking users' activities involves inserting analytics tags associated with website objects in web pages.

Current tag management systems facilitate the creation of analytics tags on a website. However, these current tag management systems utilize code-based tagging that requires knowledge of a website's HTML tags and CSS selectors to dynamically code the analytics tags. Thus, such existing analytics tagging techniques generally require technical sophistication to add code to insert analytics tagging functionality into website objects. While a website developer has such knowledge, the marketing personnel with responsibility for determining appropriate analytics tags generally do not. Therefore, marketing personnel can require the assistance of website developers to deploy analytics tags, which can lead to delays in the analytics tag deployment process.

Some prior solutions may automatically create analytics tagging code. However, these solutions still generally require some technical sophistication to identify different types of a website object to be tracked to ensure analytics tags are added to all types of the website object. For example, due to variability in the coding of websites, it is difficult for marketing personnel to identify and tag objects with similar or related functions (e.g., "Add to Cart," "Add two items to cart," "Buy Now," and "Pay") across multiple websites due to variations in object type (e.g., button, link, and image) and the specific code implementations for those functions in the different websites.

Current tag management systems do not adequately handle variations of objects in websites or propose additional relevant analytics tags.

SUMMARY

Various aspects of the present invention relate to automatically creating analytics tags for different object types of website objects in dynamic tag management. The website objects are in web pages with analytics tracking capability. In one implementation, user input is received identifying a website object for tagging in the web pages and keywords are identified based on the user input. Based on the keywords, multiple occurrences of the website object in the web are identified, wherein the multiple occurrences of the website object correspond to multiple object types. The computer automatically creates analytics tags for the website object corresponding to object types. Based on the website object, an expansion object is identified and the computer automatically creates an analytics tag for the expansion object.

BRIEF DESCRIPTION OF THE DRAWINGS

Many aspects of the present disclosure can be better understood with reference to the following drawings.

DETAILED DESCRIPTION

Figure 1:
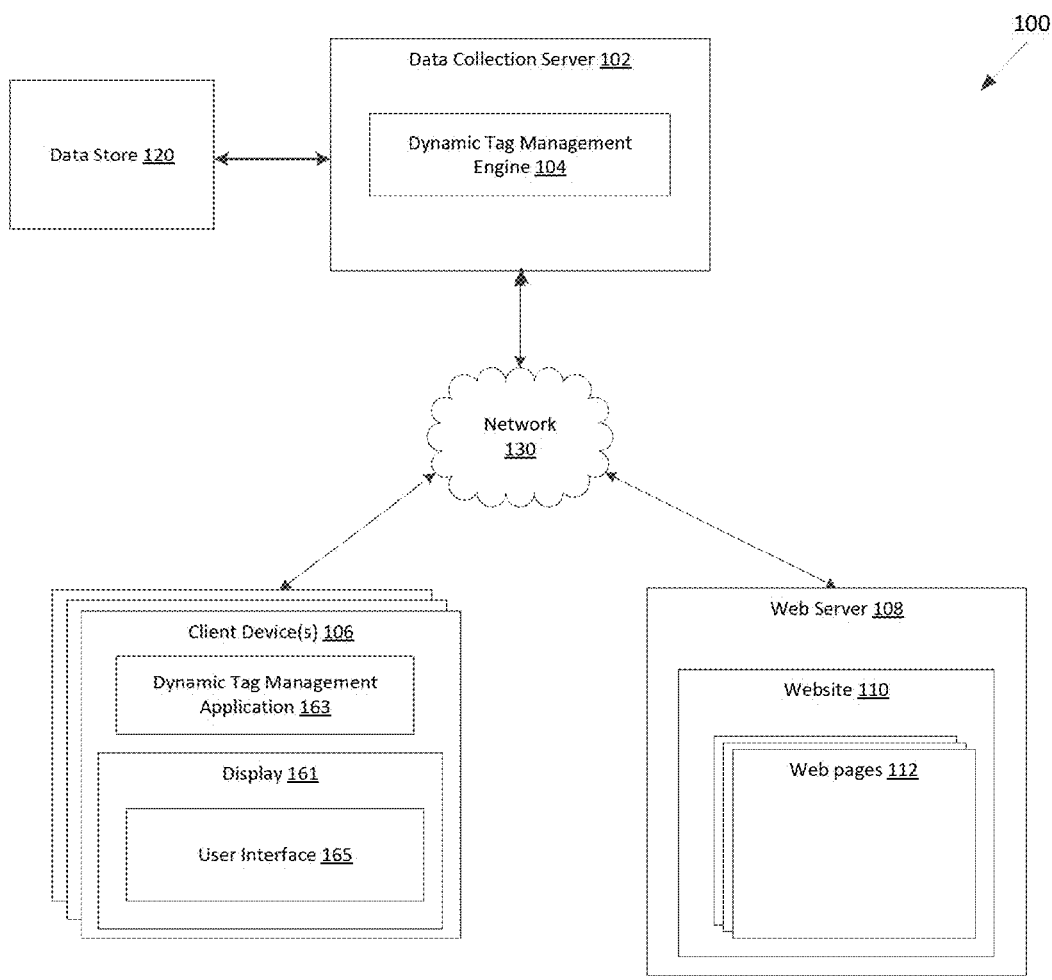
FIG. 1 is a drawing of a networked environment according to various embodiments of the present disclosure.

Described herein are methods and systems for automatically creating analytics tags for different object types of website objects by automatically identifying different types of a website object to be tracked, which enables analytics tags to be automatically generated and inserted into the website object in different web pages. This object identification technique is used in a system that provides a user interface allowing a website object to be selected for tagging and that automatically creates analytics tags for all types of the selected website object. In some embodiments, the object identification technique described herein reduces or eliminates the need to directly access or select code when tagging website objects for analytical purposes. In a specific example, certain embodiments enable a non-technical user to use a graphical user interface to input the terms "Add to Cart" and automatically add analytics tags to all object types of an "Add to Cart" website object, such as buttons, links and images, thus, handling the code variations for the object types.

In one embodiment, a user interface for a dynamic tag management system is provided to allow a user to provide an input identifying a website object in web pages of a website. Prior to user input, the dynamic tag management system performs preprocessing on the web pages to handle image variants of the website objects. The preprocessing steps can include tracking sources for images and extracting the images from the respective sources. Optical character recognition (OCR) can be used to extract and recognize text in the images. For example, an image containing the text "Add to Cart" is extracted and OCR is performed on the image. The OCR process identifies and extracts the text "Add to Cart." Each extracted image has an associated HTML tag. The extracted text is associated with the HTML tag and stored. In one embodiment, the extracted text and HTML tag are stored external to the website, such as, for example, in a storage location associated with the tag management system. The extracted text "Add to Cart," for example, is stored in a dynamic tag management system and is associated with the HTML tag for the image from which "Add to Cart" was extracted.

After a user enters input identifying a website object, the dynamic tag management system identifies stop words and extracts keywords from the user input. For example, for the user input "Add to Cart," the system identifies the keywords "Add" and "Cart." Next, the dynamic tag management system scans some or all of the web pages in the website to detect some or all instances of the keywords identified from the user input. The dynamic tag management system can also scan the preprocessed extracted text to detect all instances of the keywords. The detected instances of keywords are filtered into two groups, instances of keywords in valid HTML tags and instances of keywords in simple text segments, and the two groups are processed separately. The instances identified as valid HTML tags are grouped by the object type of HTML element associated with the HTML tag and duplicates are removed. For example, the object type of HTML elements includes buttons, images and links.

The dynamic tag management system determines the best matches with the keywords for each object type of HTML element and automatically creates analytics tags for each HTML element. The determined object types for the multiple occurrences of the website object and their corresponding analytics tags are displayed for selection to the user. The user then selects the occurrences of the website object for which she wants to have an associated analytics tag via the dynamic tag management system user interface. Once the dynamic tag management system receives the user's selections, the tag management system inserts the selected tags for the associated occurrences of the website object in the website. The user interface can also present the identified simple text segments to the user.

Existing analytics tagging techniques are also deficient because the techniques require the marketers to identify which website objects to tag without any information about relationships between the website objects. Without knowledge of relationships between the website objects, the marketer's object selections are often not as good as the selections otherwise would be. Thus, another embodiment of the present invention is a related object-suggestion feature that provides suggestions of similar or related website objects (i.e., expansion objects) for analytics tagging. The expansion objects are identified by a number of different methods either used independently or in combination, such as keyword processing, semantic similarity, identifying the user's tagging intent, and/or user actions in analytics. The disclosed tag management systems and methods provide expansion of the tagging domain by identifying some or all variations in object type for a website object via object-based analytics tagging and additional suggestions for expansion objects related to the website object.

As used herein, the term "website" is used to refer to an online service that provides content and/or one or more applications accessible via a data network. The website is accessible via a data network by a client application, such as (but not limited to) a web browser, mobile application, or dedicated application. Portions or sections of a website are referred to herein as "web pages."

As used herein, the term "analytics tag" is used to refer to a snippet of code, such as Javascript code, that captures data on users' interactions with website objects and causes the collected data to be sent to a data collection server, such as a web analytics server.

As used herein, the term "website object" is used to refer to a website element, such as an HTML element, that can be a number of types and can be represented by multiple code snippets, e.g., a button, an image and/or a link.

As used herein, the term "expansion object" is used to refer to a website object determined to be similar or related to another website object.

In the following discussion, a general description of the system and its components is provided, followed by a discussion of the operation of the same.

With reference to FIG. 1, shown is an illustrative networked environment 100 according to various embodiments. The networked environment 100 includes a data collection server, client device(s) 106, and a web server 108, which are in data communication with each other via a network 130. The network 130 includes, for example, the Internet, intranets, extranets, wide area networks (WANs), local area networks (LANs), wired networks, wireless networks, other suitable networks, or any combination of two or more such networks. For example, such networks may comprise satellite networks, cable networks, Ethernet networks, and other types of networks. Although the functionality described herein is shown in the context of the networked environment 100, other implementations are possible, such as implementing the functionality in a single computing device (e.g. desktop computer or mobile device), as a plug-in or auxiliary feature of another service executed in a computing device, and/or in arrangements of computing devices other than those shown in FIG. 1.

The data collection server 102 and/or the web server 108 may comprise, for example, a server computer or any other system providing computing capability. Alternatively, the data collection server 102 and/or the web server 108 may employ a plurality of computing devices that may be arranged, for example, in one or more server banks or computer banks or other arrangements. Such computing devices may be located in a single installation or may be distributed among many different geographical locations. For example, the data collection server 102 and/or the web server 108 may include a plurality of computing devices that together may comprise a hosted computing resource, a grid computing resource and/or any other distributed computing arrangement. In some cases, data collection server 102 and/or the web server 108 may correspond to an elastic computing resource where the allotted capacity of processing, network, storage, or other computing-related resources may vary over time.

Various applications and/or other functionality may be executed in the data collection server 102 according to various embodiments. Also, various data is stored in a data store 120 that is accessible to the data collection server 102. The data store 120 may be representative of a plurality of data stores 120 as can be appreciated and may be internal or external to the data collection server 102. The data stored in the data store 120, for example, is associated with the operation of the various applications and/or functional entities described below.

The components executed on the data collection server 102, for example, include a dynamic tag management engine 104, and other applications, services, processes, systems, engines, or functionality not discussed in detail herein. The dynamic tag management engine 104 is executed to facilitate automatically creating analytics tags for website objects based on user input and utilizing a variant handling function that automatically identifies different types of website objects to be tracked and inserting analytics tags into those website objects.

The data stored in the data store 120 includes, for example, data from the tag management system's preprocessing of web pages to handle image variants of the website objects. For example, the data store 120 includes extracted text from images that is associated with the images.

The web server 108 hosts or otherwise provides access to a website 110. Website 110 includes multiple web pages 112, the content of which may be contained in whole or in part on web server 108, other servers or data stores. The website 110 is accessed via the network 130 by, for example, the data collection server 102 or client devices 106.

The client device(s) 106 are representative of a plurality of client devices that can be coupled to the network 130. The client device(s) 106 each comprises, for example, a processor-based system such as a computer system (e.g. desktop or laptop computer, computing tablet, smartphone). The client device(s) 106 each includes a display 161, such as a liquid crystal display (LCD) or other type of display device.

The client device(s) 106 may be configured to execute various applications such as a dynamic tag management application 163 and/or other applications. The dynamic tag management application 163 may be executed in a client device 106, for example, to access network content served up by the data collection server 102 and/or other servers, thereby rendering a user interface 165 on the display 161. To this end, the client device 106 may comprise, for example, a browser, or a dedicated application such as a dynamic tag management application, and the user interface 165 may comprise a network content page, or an application screen. The client device 106 may be configured to execute applications beyond the dynamic tag management application 163 such as, for example, email applications, social networking applications, word processors, spreadsheets, and/or other applications.

Next, a general description of the operation of the various components of the networked environment 100 is provided. To begin, a user operating the client device 106 employs the dynamic tag management application 163 to establish one or more communication sessions with the dynamic tag management engine 104. A communication session may be carried out using various protocols such as, for example, hypertext transfer protocol (HTTP), simple object access protocol (SOAP), representational state transfer (REST), user datagram protocol (UDP), transmission control protocol (TCP), and/or other protocols for communicating data over the network 109. In some implementations, the user is authenticated to the dynamic tag management engine 104 using one or more user credentials.

Thereafter, the user provides an input to the dynamic tag management application 163 identifying a website object in the website 110 for which the user wants to have an associated analytics tag. The user does not need to be familiar with the website's 110 HTML tags or CSS selectors to create and associate analytics tags for the website 110. The dynamic tag management engine 104 receives the users' input via the dynamic tag management application 163 identifying a website object for tagging in the web pages 112 of the website 110. The dynamic tag management engine 104 processes the input to identify one or more keywords. Then, the dynamic tag management engine 104 identifies multiple occurrences of the website object in the web pages based on the keyword or keywords. The multiple occurrences of the website object are grouped by the dynamic tag management engine 104 based on object type and the dynamic tag management engine 104 automatically creates an analytics tag for each object type of the website object. The dynamic tag management engine 104 can also identify one or more expansion objects (e.g., similar website objects) based on the website object and automatically create an analytics tag for the expansion object. The dynamic tag management engine 104 can further make the website objects grouped by object type and the expansion objects available on the user interface 165 of the client device 106 for selection by the user. Once selected by the user, the dynamic tag management engine 104 causes the analytics tags for the selected website and expansion objects to be included in the web pages 112.

Figure 2:
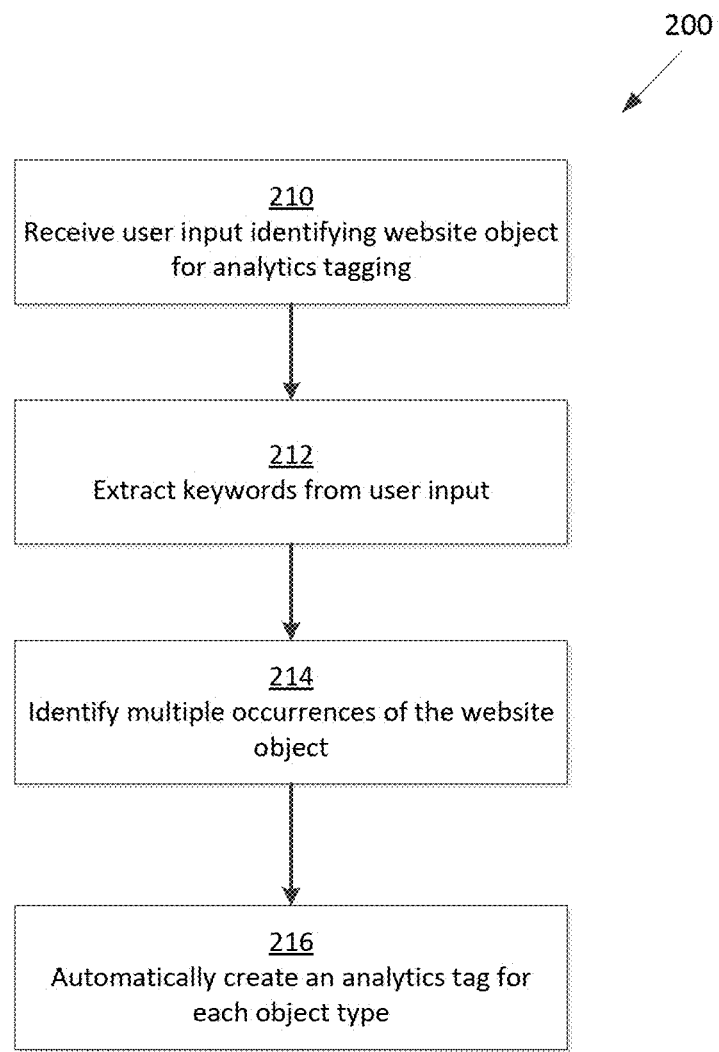
FIG. 2 is a flowchart illustrating an example of functionality implemented as portions of the tag management engine execute in a computing environment in the networked environment of FIG. 1 according to various embodiments of the present disclosure.

Referring next to FIG. 2, shown is a flowchart that provides one example of the operation of a portion of the dynamic tag management engine 104 according to various embodiments. It is understood that the flowchart of FIG. 2 provides merely an example of the many different types of functional arrangements that may be employed to implement the operation of the portion of the dynamic tag management engine 104 as described herein. As an alternative, the flowchart of FIG. 2 may be viewed as depicting an example of elements of a method 200 implemented in the data collection server 102 according to one or more embodiments.

In the example illustrated in FIG. 2, a user interacts with a web-based marketing solution, such as Adobe® Marketing Cloud, to cause the web-based marketing solution to create and associate analytics tags with website objects for a website.

At block 210, user input to apply an analytics tag to a website object is received. In one embodiment, prior to receiving user input, the dynamic tag management engine 104 preprocesses the web pages 112 of the website 110 to handle image variants of the website objects. In one embodiment, preprocessing includes tracking sources for images and extracting the images from the respective sources. OCR is then used to extract and recognize text in the images. For example, an image with an HTML tag containing the text "Add to Cart" is extracted and OCR is performed on the image. The OCR process identifies and extracts the text "Add to Cart." The extracted text is associated with the HTML tag and stored. In one embodiment, the extracted text and associated HTML tag are stored external to the website 110, such as, for example, in, for example, data store 120 of the dynamic tag management engine 104. Turning back to block 210, in one embodiment, the user input from a client device 106 is received by the dynamic tag management engine 104 via the network 130. For example, the dynamic tag management engine 104 provides an input submission user interface, through which a user can provide the input, to the client device 106 for display on the display 161.

Figure 3:
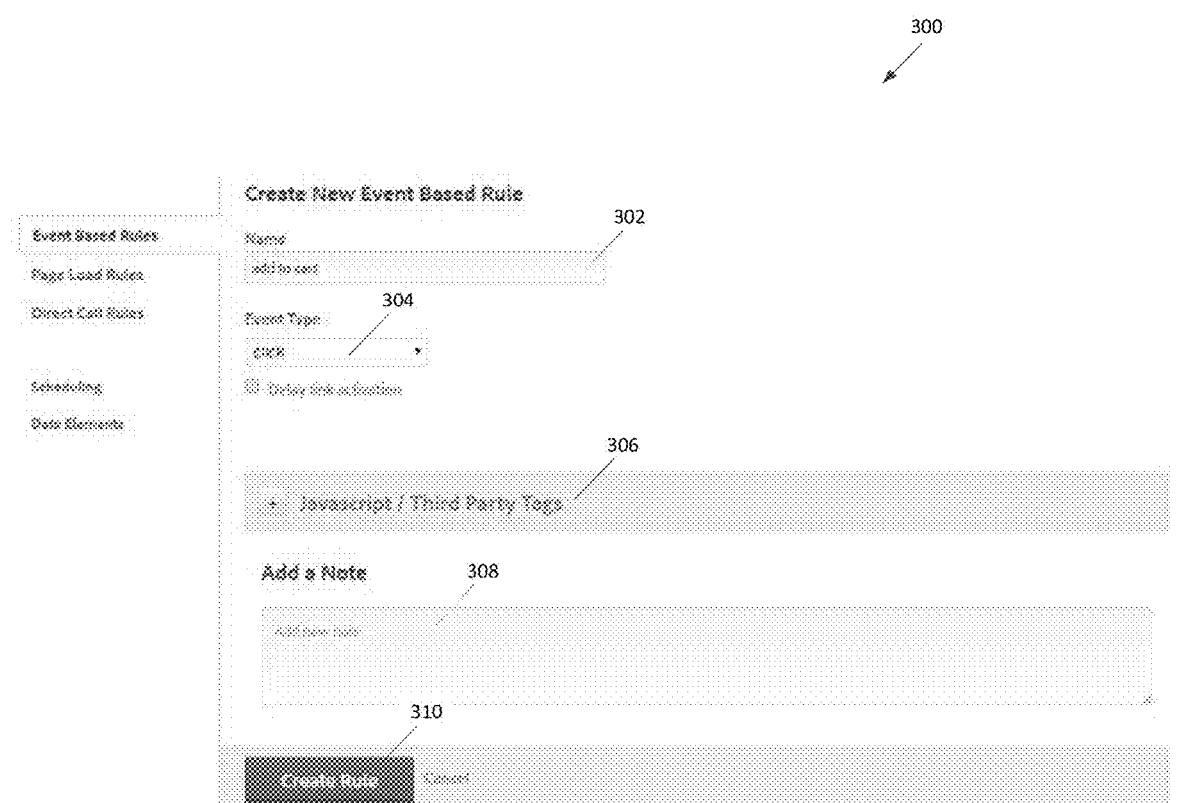
FIG. 3 is a pictorial diagram of an exemplary user interface for receiving user input for identifying a website object rendered in a client device in the networked environment of FIG. 1 according to various embodiments of the present disclosure.

FIG. 3 illustrates an exemplary input submission user interface 300 that may be used in block 210. The input submission user interface 300 includes a name input box 302 in which the user can provide terms to identify a website element. In the example shown in FIG. 3, the terms "add to cart" have been input into the name input box 302. The user interface 300 allows a user to identify the event type that she wishes to monitor by an Event Type menu 304. The Event Type menu shown in FIG. 3 is a drop down-type menu, but other types of input can be used, such as a simple input text box. The example shown in FIG. 3 illustrates that a "click"

event type was chosen in the Event Type menu 304 meaning that user desires analytics to be gathered when a website user clicks on an Add to Cart website object. Other forms of event types, such as, for example, onMouseOver, Hover, Zoom, etc., can also be used. The input submission user interface 300 also provides the user with the ability to add Javascript or Third Party Tags 306, which allows a user to insert custom JavaScript code to tag website objects. A user can also add notes to the website object rule by inputting the note to the Add new note text box 308. To submit the input relating to the website object rule, the user clicks on the Create Rule button 310, which causes the user input to be submitted to the dynamic tag management engine 104 for processing.

Returning to FIG. 2, at block 212, the received user input is processed by the dynamic tag management engine 104 to extract keywords from user input. In one embodiment, the dynamic tag management engine 104 uses an extraction application, such as Alchemy API, to extract the keywords from the user input. In some instances, the extraction application removes stop words or determines that the entire phrase including the stop words should be used. For the "add to cart" user input example, the dynamic tag management engine 104 can extract the keywords "add" and "cart" or can determine that the keyword should be the entire phrase "add to cart."

At block 214, multiple occurrences of the website object are identified in the web pages based on the extracted keyword or keywords. In one embodiment, the dynamic tag management engine 104 scans some or all of the web pages 112 in the website 110 and detects some or all instances of the extracted keyword or keywords. The dynamic tag management engine 104 determines, for each instance of a scanned keyword or scanned keywords, whether the instance is associated with a structured tag, such as an HTML tag, or a simple text segment. The occurrences of the website object with an associated structured tag instances are processed differently than the simple text segment occurrences. For example, a marketing user is typically interested in an occurrence of a website object associated with an HTML tag and not as interested in the occurrence of a simple text segment. HTML tags specify the object type, such as a button, a link, or an image, of the associated website object. For the "add to cart" user input example, the dynamic tag management engine 104 determines some or all occurrences of the keywords from "add to cart" and determines whether the "add to cart" website object is associated with an HTML tag or simple text segment.

In one embodiment, the multiple occurrences of the website object are grouped based on object type. For example, the dynamic tag management engine 104 analyzes the HTML tags associated with each occurrence of the website object, determines whether the HTML tag is valid, and determines the object type from the HTML tag of each website object occurrence. The dynamic tag management engine 104 then groups the occurrences of the website object by object type and removes duplicate occurrences. For the "add to cart" website object example, the dynamic tag management engine 104 groups occurrences of the website object by button, link, and image object types.

At block 216, an analytics tag for each object type of the website object is automatically created. In one embodiment, the dynamic tag management engine 104 utilizes attributes associated with the HTML tag for a particular occurrence of an object type to create the analytics tag. For example, the dynamic tag management engine 104 determines the intersection of attributes in the HTML tags for a particular object type and use the intersection of attributes to create an analytics tag for that particular object type. In one example, to determine the intersection of attributes, all the attributes associated with the HTML tag and their corresponding values in the website code are used to set conditions for the analytics tag. In this example, when all these conditions are satisfied for a website object in the website, the analytics tag would collect data for this website object. For groups with no common set of intersecting attributes in HTML tags, the best possible set of intersecting attributes in HTML tags is selected for the group analytics tag. The result of this is that each occurrence of the website object has an associated analytics tag.

Figure 4:
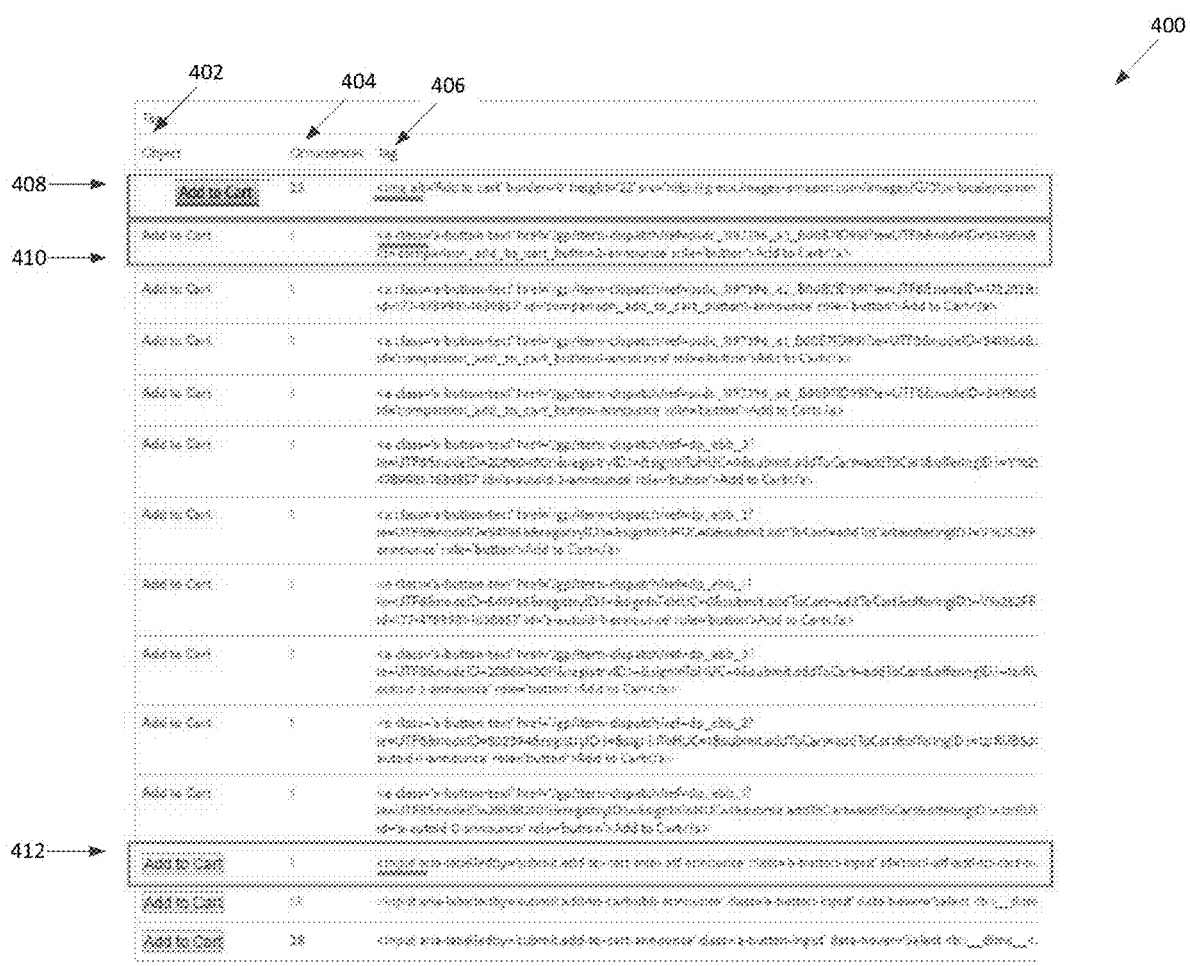
FIG. 4 is a pictorial diagram of an exemplary presentation of a website object grouped by object type and including associated analytics tags rendered in a client device in the networked environment of FIG. 1 according to various embodiments of the present disclosure.

In one embodiment, the dynamic tag management engine 104 causes the display at the client device 106 of a list of the occurrences of the website object grouped by object type with each occurrence have an associated analytics tag (e.g., generate a user interface containing the occurrences list and transmit the generated interface containing the occurrences list to the client device 106 via the network 130). For example, FIG. 4 illustrates an exemplary occurrence list 400, which may be generated by the dynamic tag management engine 104 and provided to the client device 106 at block 222, that lists occurrences of the website object "Add to Cart" group by object type, e.g., image, button, and link. The occurrence list 400 can be displayed on the display 161 of the client device 106. The occurrence list 400 includes columns indicating the object 402, e.g., "Add to Cart," the occurrences 404 of the object in the web pages of the website, and the analytics tag 406. For example, the occurrence at 408 occurs 23 times in the web pages, is an image object type, and includes code that is its analytics tag. The occurrence at 410 occurs one time, is a link object type, and includes code that is its analytics tag. The occurrence at 412 occurs one time, is another object type, and includes code that is its analytics tag.

In one embodiment, the user selects the occurrences by interacting with the display of occurrences on the client device 106 and the user selections are received by the dynamic tag management engine 104. For example, with reference to FIG. 4, the user has selected occurrences 408, 410 and 412 of the "Add to Cart" website object. The analytics tags to be associated with selected occurrences of the website object are sent to the website. In one embodiment, the dynamic tag management engine 104 sends the analytics tags to be associated with selected occurrences of the website object to the web server 108, which incorporates the analytics tags into the web pages 112 of the website 110. This then allows the data collection server 102 and ultimately the user to receive analytics relating to the analytics tags. Using the example from FIG. 4, the dynamic tag management engine 104 sends the analytics tags corresponding to the selected occurrences 408, 410 and 412 of the "Add to Cart" website object.

Figure 5:
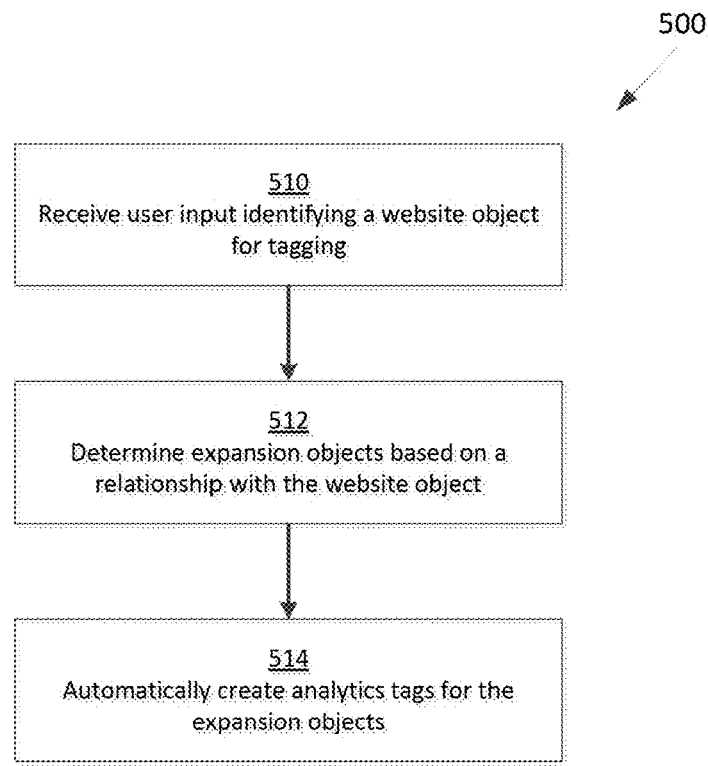
FIG. 5 is a flowchart illustrating an example of functionality implemented as portions of the dynamic tag management engine execute in a computing environment in the networked environment of FIG. 1 according to various embodiments of the present disclosure.

Referring next to FIG. 5, shown is a flowchart that provides one example of the operation of a portion of the dynamic tag management engine 104 according to various embodiments. It is understood that the flowchart of FIG. 5 provides merely an example of the many different types of functional arrangements that may be employed to implement the operation of the portion of the dynamic tag management engine 104 as described herein. As an alternative, the flowchart of FIG. 5 may be viewed as depicting an example of elements of a method 500 implemented in the data collection server 102 according to one or more embodiments.

In the example illustrated in FIG. 5, a user interacts with a web-based marketing solution, such as Adobe® Marketing Cloud, to cause the web-based marketing solution to provide a related object-suggestion feature, wherein expansion objects related to a website object are identified and analytics tags are automatically created for the expansion objects for a website. For the "add to cart" website object example, the dynamic tag management engine 104 identifies expansion objects that are related to the "add to cart" website object and creates analytics tags for the expansion objects to be used on the website 110 in order for the user to gain a better and more complete view of website users' interactions with the website 110.

Beginning at block 510, user input identifying a website object for tagging in the web pages is received. In one embodiment, the user input from a client device 106 is received by the dynamic tag management engine 104 via the network 130. For example, as described in relation to block 210 for FIG. 2 above, the dynamic tag management engine 104 provides an input submission user interface on the display 161 of the client device 106 through which a user can provide the input. As described above for FIG. 3, a user can input "add to cart" in the exemplary input submission user interface 300 identifying an "add to cart" website object. In one embodiment, the dynamic tag management engine 104 creates analytics tags for each object type of the website object identified from the user input.

At block 512, expansion objects are determined based a relationship with the website object. The relationship between the expansion object and the website object can be that the two objects contain similar or the same keywords from the user's query, that the two objects are frequently tagged together, that the two objects are frequently selected by a website user in sequence, and other suitable relationships. In one embodiment, the dynamic tag management engine 104 identifies expansion objects for the website object by a number of different methods either used independently or in combination, such as keyword processing, semantic similarity, identifying the user's tagging intent, and/or user actions in analytics. Similar to blocks 214 above, multiple occurrences of the expansion objects associated with structured tags, such as HTML tags, are identified in the web pages by the dynamic tag management engine 104. Additionally, the expansion objects can be grouped by the dynamic tag management engine 104 based on the object type of each expansion object. For the "add to cart" website object example, the dynamic tag management engine 104 identifies expansion objects that are related to the "add to cart" website object. The dynamic tag management engine can for each identified expansion object group the multiple occurrences of the expansion object by object type.

The keyword processing method utilizes the keywords from the user input to generate expansion objects. For example, with keyword processing the dynamic tag management engine 104 identifies expansion objects that contain keywords from the user input and determines a similarity score for each expansion object. The similarity score using this technique is based on the number of times the keyword or keywords occur in a corps of a large size. For example, the Leipzig English corpus can be used. The keyword processing method gives less importance to words that occur frequently, such as, for example, "the," "is," and "to." A weight for the keywords can be calculated by the following formula:

$$\text{value}(w) = \frac{1}{\log(1 + \text{freq}(w))^t}$$

Where freq(w) is the number of times word w occurs in the corpus being considered. The log in the formula is used to achieve logarithmic scaling of the frequency values. This is because the frequency distribution of words in the corpus is skewed towards large values. For every word w, the calculated values have to be normalized. A normalized score can be calculated as follows:

$$\text{score}(w) = \frac{\text{value}(w)}{M}$$

Where M=Max (value (w)) for all words w in a corpus. A similarity function is calculated for a given query q and a text string s. For example, the similarity (q, s) can be calculated as follows:

similarity(q,s)=Sum of all words in q as well as in s÷Sum of scores of all words in s This formula assumes that all words in a query (i.e., user input) are in a corpus, which may not always be the case. For words not in a corpus, a default score value can be used.

Semantic similarity identifies expansion objects that are semantically similar to the user input. For example, with the semantic similarity method, the dynamic tag management engine 104 uses a semantic tool to determine a similarity for an expansion object. For example, the word2vec tool can be used. The dynamic tag management engine 104 provides the word2vec tool a text corpus, such as Google® News, as input and the tool produces word vectors as output. The tool first constructs a vocabulary from the training text data and then learns vector representations of words. The learned vectors are used to calculate a similarity score for potential expansion objects and a website object.

With methods for identifying expansion objects that involve identifying user's tagging intent, association rule mining, which is a data mining model focused on finding frequent co-occurring associations among a collection of items, is performed on existing tags in multiple websites to extract website objects frequently tagged together. Then given a website object, the dynamic tag management engine 104 uses the results of the association rule mining to identify expansion objects frequently tagged along with the website object. For example, if the dynamic tag management engine 104 determines from association rule mining that users who use an analytics tag with an "add to cart" button website object also tend to insert analytics tags for the website objects "Payment" and "Product Features," the dynamic tag management engine 104 identifies the "Payment" and "Product Features" objects as expansion objects for the "add to cart" website object.

Additionally, with methods for identifying expansion objects that involve using prior website user actions, the dynamic tag management engine 104 analyzes prior website user action to determine website objects that are related to each other by being used in sequence with one another. The dynamic tag management system 104 utilizes the sequence information to identify and present to the user expansion objects related to the identified website object. For example, if a dynamic tag management engine 104 has an analytics tag set up for an "add to cart" button website object, the dynamic tag management engine 104 monitors and analyzes the clickstream data associated with using the "add to cart" button. Based on the clickstream data, the dynamic tag management engine 104 determines useful insights as to the way website users interact with the website, such as, for example, that website users example product features before clicking the "add to cart" button, and the URL following a click on the "add to cart" button is the "pay" URL.

At block 514, an analytics tag for each identified expansion object is automatically created. In one embodiment, the dynamic tag management engine 104 utilizes attributes associated with the HTML tag for a particular occurrence of an object type of an expansion object to create the analytics tag. For example, the dynamic tag management engine 104 determines the intersection of attributes in the HTML tags for a particular object type and use the intersection of attributes to create an analytics tag for that particular object type of the expansion object. In one example, to determine the intersection of attributes, all the attributes associated with the HTML tag and their corresponding values in the website code are used to set conditions for the analytics tag. In this example, when all these conditions are satisfied for a website object in the website, the analytics tag would collect data for this website object. For groups with no common set of intersecting attributes in HTML tags, the best possible set of intersecting attributes in HTML tags is selected for the group analytics tag. The result of this is that each occurrence of the expansion object has an associated analytics tag.

Figure 6:
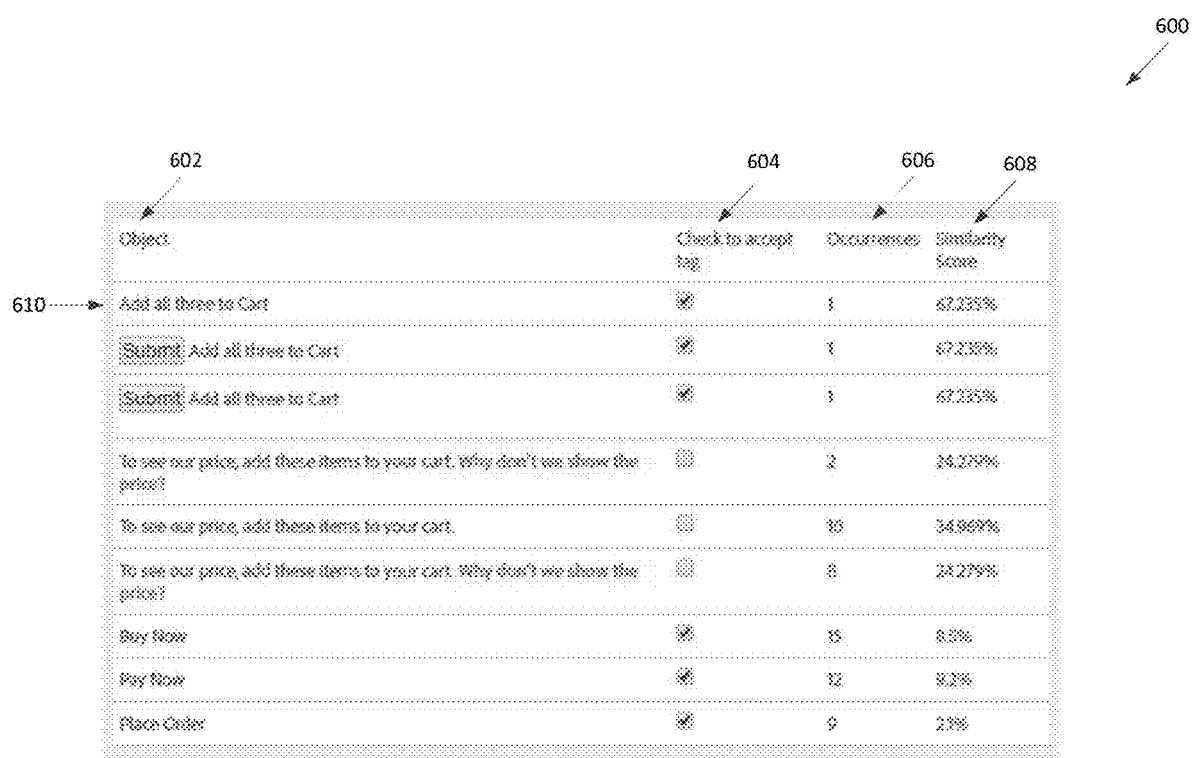
FIG. 6 is a pictorial diagram of an exemplary presentation of extension objects associated with a website object rendered in a client device in the networked environment of FIG. 1 according to various embodiments of the present disclosure.

In one embodiment, the dynamic tag management engine 104 causes the display at the client device 106 of a list of identified expansion objects (e.g., the dynamic tag management engine 104 generates a user interface containing the expansion objects list and transmit the generated interface containing the expansion objects list to the client device 106 via the network 130). FIG. 6 illustrates an exemplary expansion object list 600 of expansion objects for the website object "Add to Cart." The expansion object list 600 can be displayed on the display 161 of the client device 106. The expansion object list 400 includes columns indicating the expansion object 602, the occurrences 606 of the expansion object in the web pages of the website, and a similarity score 608 for the expansion object compared to the website object, e.g. "add to cart."

The similarity score indicates the similarity of the expansion object to the website object and can be calculated using a number of different methods either used independently or in combination, such as keyword processing, semantic similarity, identifying the user's tagging intent, and/or user actions in analytics, as described above. For example, the expansion object "Add all three to Cart" 610 occurs one time in the web-pages and has a similarity score of 67.235% indicating a relatively high similarity to the "add to cart" website object. The "Check to accept tag" column 604 is used by the user to select expansion objects. For example, in FIG. 6, the user has selected the "Add all three to Cart" expansion object 610 by checking the box in the "Check to accept tag" column 604. Additionally, for FIG. 6 the user has also selected the expansion objects "Submit Add all three to Cart," "Submit Add all three to Cart," "Buy Now," "Pay Now," and "Place Order." In one embodiment, the dynamic tag management engine 104 receives from the client device 106 the user's selection of expansion objects. Each expansion object selected has an associated analytics tag created previously by the dynamic tag management engine 104. For the example in FIG. 6, the dynamic tag management engine 104 receives from the client device the user's selection of the expansion objects "Add all three to Cart," "Submit Add all three to Cart," "Submit Add all three to Cart," "Buy Now," "Pay Now," and "Place Order." The dynamic tag management engine 104 sends the analytics tags to be associated with selected expansion objects to the web server 108 where the web server incorporates the analytics tags into the web pages 112 of the website 110. This then allows the data collection server 102 and ultimately the user to receive analytics relating to the analytics tags.

Figure 7:
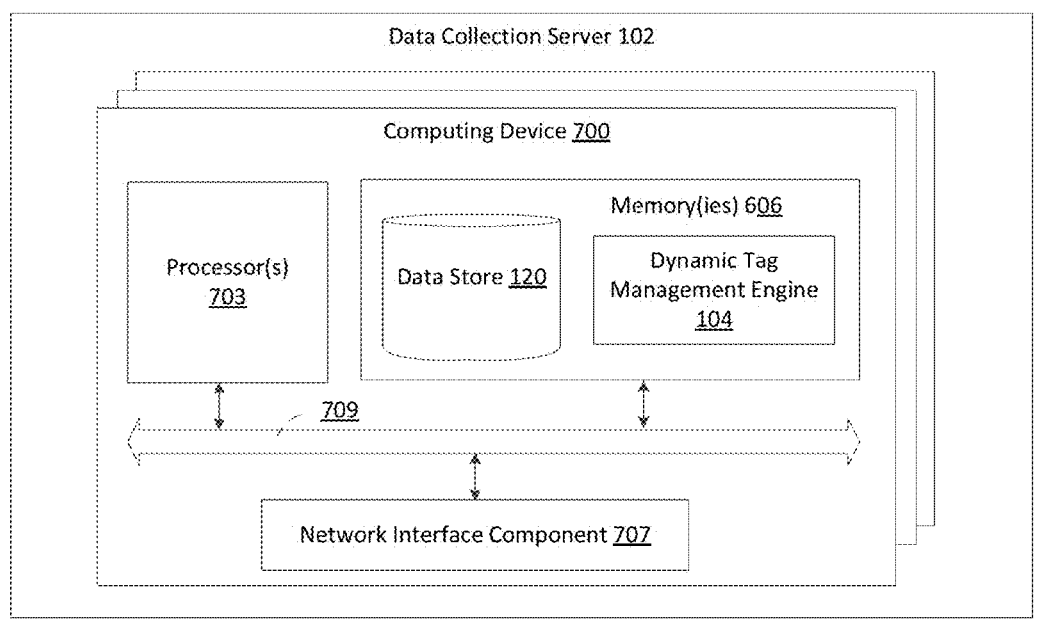
FIG. 7 is a schematic block diagram that provides one example illustration of a computing environment employed in the networked environment of FIG. 1 according to various embodiments of the present disclosure.

Any suitable computing systems may be used to implement the features described above with respect to FIGS. 1-6. For example, with reference to FIG. 7, shown is a schematic block diagram of the computing environment 103 according to an embodiment of the present disclosure. The data collection server 102 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are a dynamic tag management engine 104, and potentially other applications. Also stored in the memory 706 may be a data store 120 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706. The local interface 709 may comprise additional systems designed to coordinate this communication, including, for example, performing load balancing. The processor 703 may be of electrical or of some other available construction.

Although the data collection server and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or other suitable components that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components. Such technologies are generally well known by those skilled in the art and, consequently, are not described in detail herein.

The flowcharts of FIGS. 2 and 5 show the functionality and operation of an implementation of portions of the data collection server 102. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code. If embodied in hardware, each block may represent a circuit or a number of interconnected circuits to implement the specified logical function(s).

Although the flowcharts of FIGS. 2 and 5 show a specific order of execution, it is understood that the order of execution may differ from that which is depicted. For example, the order of execution of two or more blocks may be scrambled relative to the order shown. Also, two or more blocks shown in succession in FIGS. 2 and 5 may be executed concurrently or with partial concurrence. Further, in some embodiments, one or more of the blocks shown in FIGS. 2 and 5 may be skipped or omitted. In addition, any number of counters, state variables, warning semaphores, or messages might be added to the logical flow described herein, for purposes of enhanced utility, accounting, performance measurement, or providing troubleshooting aids. It is understood that all such variations are within the scope of the present disclosure.

Also, any logic or application described herein, including the data collection server, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the data collection server 102, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices operating as the same data collection server 102. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item or term may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method implemented on a computer for analytics tagging of website objects in web pages with analytics tracking capability, the method comprising:
   receiving, by the computer, user input identifying a website object to be tagged in the web pages, wherein the website object performs a first function implemented by way of a first code snippet;

extracting, by the computer, keywords from the user input;

identifying, by the computer, multiple occurrences of the extracted keywords in the web pages, wherein each occurrence of at least one of the extracted keywords corresponds to an occurrence of the website object, wherein a first occurrence of the website object is of a first object type and a second occurrence of the website object is of a second object type, and wherein each of the first object type and the second object type performs the first function implemented by way of a code snippet different from the first code snippet;

automatically creating, by the computer, a first analytics tag for the first object type and inserting the first analytics tag into the first occurrence of the website object;

automatically creating, by the computer, a second analytics tag for the second object type and inserting the second analytics tag into the second occurrence of the website object;

identifying, by the computer, an expansion object, wherein the expansion object performs a function similar or related to the first function;

displaying, in a user interface, a list including the website object, the expansion object and a similarity score indicating a degree of similarity between the website object and the expansion object, and in response to receiving user input indicating that the website object and the expansion object are sufficiently similar, inserting a third analytics tag into the expansion object.

2. The method of claim 1, further comprising grouping the multiple occurrences of the website object based on object types.

3. The method of claim 1, wherein identifying multiple occurrences of the website object comprises:
identifying HTML tags associated with the keywords; and
identifying simple text segments containing the keywords.

4. The method of claim 3, wherein automatically creating the analytics tag for the website object corresponding to an object type comprises:
determining an intersection of attributes in the HTML tags for the object type; and
generating an analytics tag using the intersection of attributes.

5. The method of claim 1, further comprising preprocessing the web pages, wherein preprocessing comprises:
identifying an image in the web pages;
identifying an associated image tag for the image by performing optical character recognition on the image; and
associating an associated image text with the image.

6. The method of claim 1, further comprising:
outputting the website object and corresponding analytics tags for user selection.

7. A method implemented on a computer for analytics tagging of website objects in web pages of a website with analytics tracking capability, the method comprising:
receiving user input identifying a website object to be tagged in the web pages, wherein the website object performs a first function implemented by way of a first code snippet;
extracting keywords from the user input;
identifying multiple occurrences of the extracted keywords in the web pages, wherein each occurrence of at least one of the extracted keywords corresponds to an occurrence of the website object, wherein a first occurrence of the website object is of a first object type, and a second occurrence of the website object is of a second object type, and wherein each of the first object type and the second object type performs the first function implemented by way of a code snippet different from the first code snippet;
automatically creating, by the computer, a first analytics tag for the first object type and inserting the first analytics tag into the first occurrence of the website object;
determining an expansion object that performs a function similar or related to the first function; and
automatically creating, by the computer, an analytics tag for the second object type and inserting the second analytics tag into the second occurrence of the website object;
displaying, in a user interface, a list including the website object, the expansion object and a similarity score indicating a degree of similarity between the website object and the expansion object; and
in response to receiving user input indicating that the website object and the expansion object are sufficiently similar, inserting a third analytics tag into the expansion object.

8. The method of claim 7, wherein determining an expansion object comprises determining a semantic similarity value for the expansion object compared to the website object.

9. The method of claim 7, wherein determining an expansion object comprises performing association rule mining to identify marketers' tagging intent by determining that the expansion object is frequently associated with the website object.

10. The method of claim 7, wherein determining an expansion object comprises analyzing a sequence of user actions on the website to determine that the expansion object is frequently associated with the website object.

11. The method of claim 7, wherein the expansion object comprises an associated HTML tag corresponding to an object type.

12. The method of claim 11, wherein automatically creating the analytics tag for the expansion object comprises:
determining an intersection of attributes in HTML tags for the object type; and
generating the analytics tag for the expansion object by using the intersection of attributes.

13. The method of claim 7, further comprising preprocessing the web pages, wherein preprocessing comprises:
identifying an image in the web pages;
performing optical character recognition on the image to identify associated image text; and
associating the associated image text with the image.

14. The method of claim 7, further comprising:
outputting the expansion object and corresponding analytics tags for user selection.

15. A system for analytics tagging of website objects in web pages with analytics tracking capability, the system comprising:
a processing device;
a memory device communicatively coupled to the processing device, wherein the processing device is configured to execute instructions included in the memory device configured to perform operations comprising:

receiving user input identifying a website object to be tagged in the web pages, wherein the website object performs a first function implemented by way of a first code snippet;

extracting keywords from the user input;

identifying multiple occurrences of the extracted keywords in the web pages, wherein each occurrence of at least one of the extracted keywords corresponds to an occurrence of the website object, wherein a first occurrence of the website object is of a first object type and second occurrence of the website object is of a second object type, and wherein each of the first object type and the second object type performs the first function implemented by way of a code snippet different from the first code snippet;

automatically creating a first analytics tag for the first object type and inserting the first analytics tag into a first occurrence of the website object;

automatically creating a second analytics tag for the second object type and inserting the second analytics tag into the second occurrence of the website object;

identifying an expansion object, wherein the expansion object performs a function similar or related to the first function;

presenting a list including the website object, the expansion object and a similarity score indicating a degree of similarity between the website object and the expansion object; and in response to receiving user input indicating that the website object and the expansion object are sufficiently similar, inserting a third analytics tag into the expansion object.

16. The system of claim 15, wherein the processing device is configured to execute instructions including in the memory device to perform operations further comprising:

grouping the multiple occurrences of the website object based on object type.

17. The system of claim 15, wherein the processing device is configured to execute instructions including in the memory device to perform operations further comprising:

outputting the website object and corresponding analytics tags for user selection.

\* \* \* \* \*